Feb. 11, 1969  S. N. DOMENICO  3,427,457
APPARATUS FOR AUTOMATICALLY FOLLOWING A LINE ON A CHART
Filed March 4, 1966

SAMUEL N. DOMENICO
INVENTOR.

BY Buell B. Hamilton
ATTORNEY.

United States Patent Office 3,427,457
Patented Feb. 11, 1969

3,427,457
APPARATUS FOR AUTOMATICALLY FOLLOWING A LINE ON A CHART
Samuel N. Domenico, Tulsa, Okla., assignor to Pan American Petroleum Corporation, Tulsa, Okla., a corporation of Delaware
Filed Mar. 4, 1966, Ser. No. 531,820
U.S. Cl. 250—202                     8 Claims
Int. Cl. G05b 1/00; G01j 1/20; H01j 39/12

ABSTRACT OF THE DISCLOSURE

Apparatus for automatically following a line on a chart includes a source of light which forms an elongated spot of light on the chart. At least one photocell is exposed to each end of the light spot. As the chart moves with respect to the assembly including the light and photocell, signals from the photocells are combined in one way to move the assembly transversely to the direction of motion of the chart. The photocell signals are combined in another way to turn the light spot and align it with the line being followed. The assembly thus avoids being sidetracked onto intersecting lines.

---

This invention relates to record reproduction equipment. More particularly it relates to apparatus designed to follow a recorded trace so the record can be reproduced either in the same form or in a different form.

In seismic exploration for petroleum, and in well logging, many records have been made in the form of dark traces on paper. These are suitable for visual analysis. Modern methods of analysis, however, require the records to be in other forms such as magnetic records or more recently in digital form. In order to re-record the visual records in more useful form, many trace following mechanisms have been developed. In these the record is ordinarily mounted on rollers and moved past light-sensitive means which follow the trace by moving to a position where the dark trace reduces light received by the light-sensitive means. A principal difficulty with such trace followers is that where two traces intersect, the follower may follow the wrong trace.

An object of this invention is to provide trace following means with increased ability to continue following a given trace. Other objects will be apparent to those skilled in the art from the following description and claims.

In general, I accomplish the objects of my invention by lighting the record with at least one elongated spot of light and using at least two light-sensitive means, one at each end of the elongated spot. Signals from the light-sensing means are combined in one way and are fed to one servo system to move the follower assembly transversely of the record, in the usual way, to cause the assembly to follow the trace. The signals are combined in another way and fed to a second servo system to rotate the light spot so that it remains oriented along the trace. Thus, when the follower mechanism reaches the intersection of two traces, a long section of the trace being followed is illuminated while only a short section of the intersecting trace is lighted. For this reason the trace being followed has a great influence on the follower mechanism while the intersecting trace has little influence. The result is that the follower assembly continues to follow the original trace rather than being deflected onto an intersecting trace.

Figure 1:
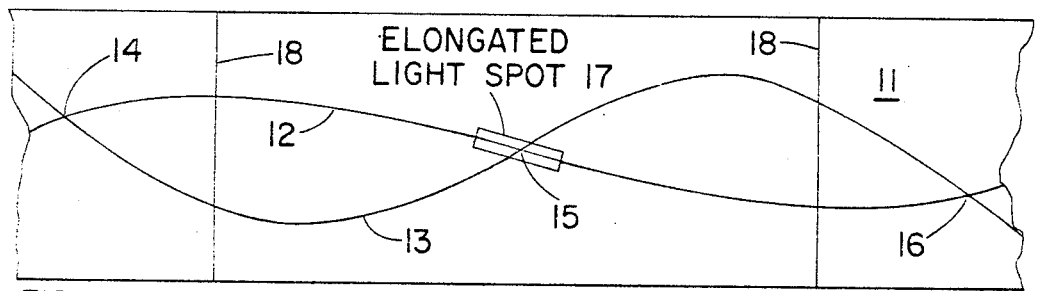
Figure 2:
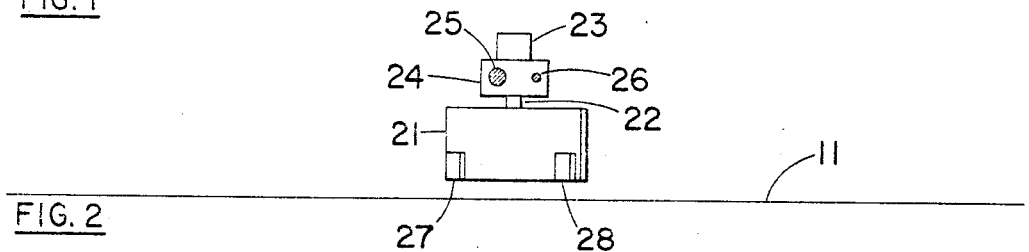
Figure 3:
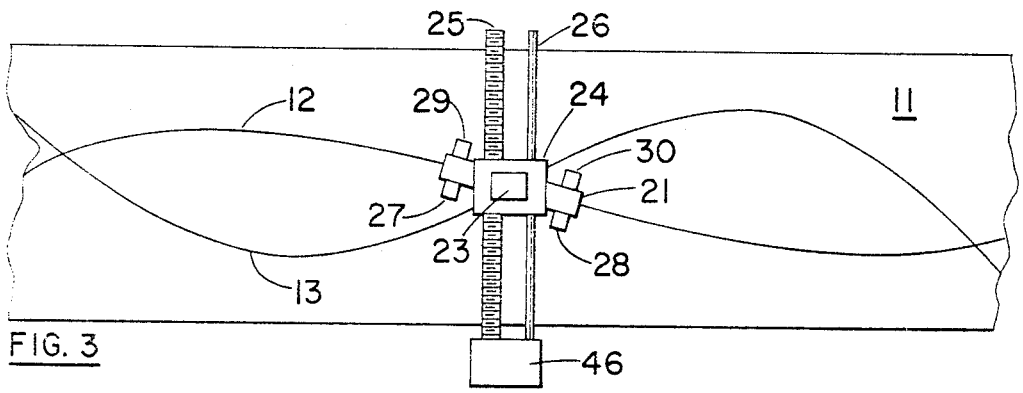
Figure 4:
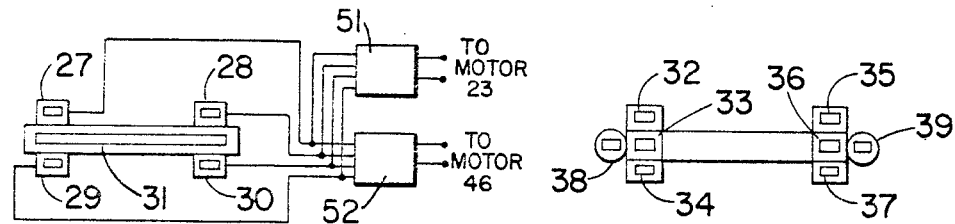
Figure 5:
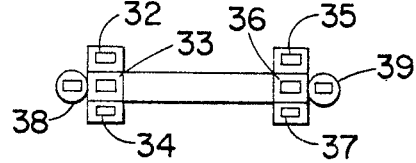

My invention will be better understood from the drawing in which FIGURE 1 is a view of a record having two intersecting traces and an elongated light spot at one of the intersections. FIGURE 2 is a side-view of one form of apparatus in accordance with my invention showing a follower assembly above a record. FIGURE 3 is a plan view of the form of apparatus shown in FIGURE 2. FIGURE 4 is a view of the bottom side of the follower head shown in FIGURES 2 and 3. FIGURE 5 is a view of a different form of follower head using multiple light sources, the side which is shown being that facing the record.

Considering the drawing in more detail, in FIGURE 1, a record 11 includes two traces, 12 and 13, which intersect at points 14, 15 and 16 as shown. The record is illuminated at intersection 15 by elongated light spot 17. It will be obvious that any light-sensitive follower will be greatly influenced by trace 12, while trace 13, being illuminated over a relatively short distance, will have very slight influence on the follower mechanism. The same will be true when the light spot and follower mechanism reaches scale lines 18.

In FIGURES 2 and 3 an assembly is shown including a follower head 21 which is mounted on a rotatable shaft 22. This shaft is supported and turned by motor 23 which is carried by a mounting bracket 24. The mounting bracket is, in turn, supported over the record by rods 25 and 26 shown in cross-section in FIGURE 2 but shown better in FIGURE 3. As shown in FIGURE 3, rod 25 is threaded and is turned by motor 46 to move the follower assembly transversely with respect to the record.

Mounted on follower head 21, and actually a part of it, are light-sensitive means 27, 28, 29 and 30. Preferably a magnified image of an edge of trace 12 is focused on these photocells in the manner shown in U.S. Patent 3,155,452 for example. A light source inside the follower head provides light for the elongated light spot on the record.

The output signals from photocells 27 and 28 are added, preferably after amplification. The output signals from photocells 29 and 30 are also added. These signals are employed to control motor 46 for centering the follower assembly over the trace. Output signals from cells 28 and 29 are added as are the signals from cells 27 and 30 and the resultant two signals are used to control motor 23 to turn follower head 21 to orient the elongated light spot along the trace.

Control circuits are conventional and may be similar to those shown in U.S. Patent 3,198,949 for example. In fact, light-sensitive devices 27, 28, 29 and 30 may be double photocells as shown in U.S. Patent 3,198,949, if desired. In the drawing, control circuit 51 controls motor 23, and control circuit 52 controls motor 46.

In FIGURE 4, a bottom view of the follower head used in the apparatus of FIGURES 2 and 3 is shown. This view shows a single slot 31 for shaping the elongated light spot. Photocells 27, 28, 29 and 30 are shown arranged at each end of the slotted head. As shown in the drawing, slotted covers may be used over the photocells to further accentuate the tendency of the head to follow the original trace.

FIGURE 5 shows the bottom view of another follower head using three light sources 32, 33 and 34 on one end, and three others, 35, 36 and 37 on the other end. In this case, only two photocells 38 and 39 are used. Each group of three blinking light sources and one photocell is like that shown in U.S. Patent 3,198,950. Lights 32 and 35 are in phase as are lights 34 and 37. Lights 33 and 36 are in phase with each other and with the other lamps, blinking at twice the frequency of the others as explained in detail in the patent. Motion of the assembly by motor 46 to center the assembly over the trace is controlled by a simple adding of signals from the two photocells, the action being as described in the patent. The assembly orienting the direction of the light spot by means of motor 23 is controlled by inverting the signal from one photocell and then adding this inverted signal to that from the other photocell. The resulting signal is then used, again as described in the patent, to operate motor 23. In FIGURE 5 slotted covers are shown over each light source. These are positioned so that light through all three slots at one end of the head coincide to form a single elongated light spot on the record. In this case, two separate elongated light spots oriented along the trace are formed. It will be obvious, however, that single long light sources can be substituted for each pair of lights such as 32 and 35. Each photocell is exposed to only one end of the elongated spot in this case.

It will be obvious that most of the follower systems described in the prior art can be adapted for my purposes. It is only necessary to use at least one elongated light spot with at least two light-sensitive means, one at each end of the spot. Signals from these two cells are combined in one way to cause the follower assembly to follow the traces. The signals are combined in another way to cause the follower assembly to rotate so that light spot remains oriented along the trace.

The position of the follower assembly with respect to the side of the record, a base line, or the like is recorded magnetically, digitally, photographically, as an ink trace, or in any other way desired. The same system, using at least one elongated light spot and at least two light-sensitive means, can be employed to follow a base line so the difference between the positions of the base line and trace can be more accurately recorded. Elongated light spots oriented transverse to the record can be used in combination with a photoelectric device to pick up and record scale lines such as timing lines on seismic records or depth lines on well logs.

Particularly in the case of following well logs, two follower heads may be coupled together at a fixed transverse distance apart on rods 25 and 26 in FIGURE 3. Thus, if the trace goes off the top of the record and appears at the bottom edge, the second head is properly located and oriented to pick up the trace at the bottom of the record and follow it until the trace reappears at the top of the record.

Many variations in the apparatus described above will be apparent to those skilled in the art. For example, the light spot may be of several elongated shapes such as rectangles, ellipses and the like. It may also be made up of a line of spots or round or other shape is desired. The length of the elongated spot may be from about 2 up to 10 or 20 times the width, but preferably should be only 4 or 5 times the width. A compromise is advisable. The greater the length to width ratio, the better the follower discriminates against intersecting traces. The use of long spots which are too long, however, tend to smooth out minor fluctuations of the trace being followed on the record. This can be an advantage, since elimination of high frequencies is sometimes desirable. In many cases, however, a more accurate reproduction of the record is required. In addition, long spots decrease the ability of the mechanism to follow a sharp break in the curve. The compromise between these various effects explains the preferred length of about 4 or 5 times the width. Preferably, the width of the light spot should be only 3 or 4 times the width of the trace, but may be from about 2

Still other variations are possible such as holding the record still and moving the entire follower assembly along the record as shown, for example, in U.S. Patent 3,040,320. The important motion is a relative one of the record with respect to the follower assembly regardless of whether one or the other or both move with respect to the surface of the each. Other arrangements such as placing the follower assembly below rather than above the record or placing the light source on one side of the record and the light-sensitive means on the other side are also possible. The light-sensing means may be of the photoconductivity type such as the cadmium sulfide cells used in photography. Other types such as the photovoltaic or photoemissive types may also be used.

While the greatest application of my apparatus is to reproducing seismic surveying records and well logs, it will be obvious that other traces such as weather charts, manually drawn traces and the like can also be followed and reproduced in the same or other forms.

Since many variations and applications of my apparatus will be apparent to those skilled in the art, I do not wish to be limited to the examples described above, but only by the following claims.

I claim:

1. In apparatus for following a recorded trace and producing a new trace related thereto in which apparatus the record containing said trace is moved relative to a trace-follower assembly, the direction of motion of said assembly with respect to said record being substantially in the direction of said trace along said record, and the position of said assembly with respect to said record is recorded, the improvement comprising, means for forming at least one elongated spot of light on said record, said spot having a width of from about 2 to about 10 times the width of said trace and a length of from about 2 to about 20 times the width of said spot, at least two light-sensing means separated in the direction in which said light spot is elongated, means actuated by signals from said at least two light-sensing means for moving said assembly in a direction transverse to the direction of movement of said record to cause said assembly to follow said trace, and means also actuated by signals from said at least two light-sensing means to turn said assembly to orient said elongated light spot along the trace being followed.

2. The apparatus of claim 1 in which said means for forming said at least one elongated spot of light forms a spot having a width from about 3 to about 4 times the width of said trace and having a length from about 4 to about 5 times the width of said spot.

3. The apparatus of claim 1 which includes two photocells at each end of said elongated spot of light, one on each side of said spot at each end, means for adding the signals from the photocells on each side to provide signals for moving the assembly transversely to follow the trace, and means for adding the signals from photocells on opposite sides of the light spot at opposite ends of the spot to provide signals for rotating the light spot to maintain the orientation of the elongated spot along the trace being followed.

4. The apparatus of claim 3 in which said means for forming said at least one elongated spot of light, forms a spot having a width from about 3 to about 4 times the width of said trace and having a length from about 4 to about 5 times the width of said spot.

5. Apparatus for following a trace on a record as said apparatus and record are moved relative to each other comprising, an assembly including means for forming at least one elongated spot of light on said record, said spot having a width of from about 2 to about 10 times the width of said trace and a length of from about 2 to about 20 times the width of said spot, said assembly also including at least two light-sensing means separated in the direction in which said light spot is elongated, means actuated by signals from said at least two light-sensing means for moving said assembly in a direction transverse to the direction of movement of said record to cause said assembly to follow said trace, means also actuated by signals from said at least two light-sensing means to turn said assembly to orient said elongated light spot along the trace being followed.

6. The apparatus of claim 5 in which said means for forming said at least one elongated spot of light, forms a spot having a width from about 3 to about 4 times the width of said trace and having a length from about 4 to about 5 times the width of said spot.

7. The apparatus of claim 5 which includes two photocells at each end of said elongated spot of light, one on each side of said spot at each end,
 means for adding the signals from the photocells on each side to provide signals for moving the assembly transversely to follow the trace,
 and means for adding the signals from photocells on opposite sides of the light spot at opposite ends of the spot to provide signals for rotating the light spot to maintain the orientation of the elongated spot along the trace being followed.

8. The apparatus of claim 7 in which said means for forming said at least one elongated spot of light, forms a spot having a width from about 3 to about 4 times the width of said trace and having a length from about 4 to about 5 times the width of said spot.

References Cited
UNITED STATES PATENTS

| | | | |
|---|---|---|---|
| 3,155,452 | 11/1964 | Plankeel | 346—31 |
| 3,198,949 | 8/1965 | Holdo | 250—202 |
| 3,198,950 | 8/1965 | Moseley | 250—202 |

ROBERT SEGAL, *Primary Examiner.*

C. R. CAMPBELL, *Assistant Examiner.*

U.S. Cl. X.R.

250—203, 208, 209, 210; 346—31